United States Patent [19]

Godard

[11] 4,112,391
[45] Sep. 5, 1978

[54] GAS LASER GENERATOR

[75] Inventor: Bruno Godard, Gif-sur-Yvette, France

[73] Assignee: Compagnie Generale d'Electricite S.A., Paris, France

[21] Appl. No.: 713,946

[22] Filed: Aug. 12, 1976

[30] Foreign Application Priority Data

Aug. 21, 1975 [FR] France .................................. 75 25897

[51] Int. Cl.$^2$ ................................................ H01S 3/00
[52] U.S. Cl. ........................ 331/94.5 PE; 331/94.5 D; 331/94.5 G; 330/4.3
[58] Field of Search .................. 331/94.5 PE, 94.5 D, 331/94.5 G; 330/4.3

[56] References Cited

U.S. PATENT DOCUMENTS

| 3,729,689 | 4/1973 | Godard | 331/94.5 |
| 3,821,664 | 6/1974 | Godard | 331/94.5 R |
| 3,879,681 | 4/1975 | Godard | 331/94.5 PE |
| 3,882,418 | 5/1975 | Godard | 331/94.5 G |
| 3,893,046 | 7/1975 | Godard | 331/94.5 G |
| 4,011,525 | 3/1977 | Godard | 331/94.5 PE |

Primary Examiner—Martin H. Edlow
Attorney, Agent, or Firm—Sughrue, Rothwell, Mion, Zinn and Macpeak

[57] ABSTRACT

The invention relates to a gas laser generator. This generator comprises two flat energization lines having the shape of arcs of a half parabola, these lines being in electrical continuity along a common segment connecting the merged focusses of the half parabola arcs and a joint situated near the apexes of the half parabola arcs. Application to nitrogen laser generators.

7 Claims, 2 Drawing Figures

GAS LASER GENERATOR

FIELD OF THE INVENTION

The present invention relates to gas lasers and more particularly to gas lasers comprising flat-plate electric excitation lines.

BACKGROUND OF THE INVENTION

A gas laser generator comprising parallel superimposed flat plates is known comprising: firstly, a first metallic plate, a first insulating plate and a second metallic plate forming together a first excitation line and secondly, a third metallic plate, a second insulating plate and a fourth metallic plate forming a second excitation line. The first and second metallic plates are spaced apart from each other and each includes a slot separating it into two distinct parts, these slots being disposed facing each other. Two electrodes are disposed on either side of these slots and are connected to the second and third metallic plates along an edge of these slots. A laser tube surrounding the electrodes and containing an active gaseous medium is disposed in the space situated between the second and third metallic plates along these slots. Lastly, this gas laser generator comprises a spark gap suitable for setting up a brief electric discharge generating in the two excitation lines simultaneously a travelling current wave.

In the gas laser described hereinabove, a triangular shape is preferably given to the metallic plates. The spark gap occupies an apex of the triangle and the laser tube occupies the opposite side to this apex. The dimensions of the side of the triangle are so determined that the difference in time between the instant of arrival of the wave at the respective ends of the tube corresponds to the time taken by the laser light radiation to go from one end to the other of this tube.

But, because of its circular form, the current wave excites the active gas at a speed which cannot be equal at all times to the propagation speed of the laser radiation in the tube. Disadvantages and more particularly a reduction in the power of the laser result therefrom.

It is known that it is possible, by cutting out metallic plates in the shape of a parabola and by placing the spark gap at the focus of these parabolas, to set up a rectilinear travelling current wave, which in principle makes it possible to remedy these drawbacks. But, in the case of a laser comprising two excitation lines, it is then necessary to provide a spark gap on each line, this causing other disadvantages, for it is difficult to synchronise the discharges of two spark gaps.

Prefered embodiments of the present invention remedy these disadvantages and produce a gas laser generator comprising two flat-plate excitation lines, in which the arrival of the current wave along the laser tube is effected at speed which is equal at each instant to that of the laser radiation.

SUMMARY OF THE INVENTION

The present invention provides a gas laser generator comprising a tube containing an active gaseous medium connected to and sandwiched between a pair of excitation lines; each excitation line being a flat transmission line having a first part with one edge generally in the shape of a half parabola, another edge running near the axis of the half parabola and a third edge provided by the laser tube cutting across the half parabola at an angle to the axis of the half parabola such that a wave travelling along the transmission line in direction parallel to the axis at a transmission line speed moves along the tube at substantially the speed of light in the gaseous medium, the shape of the remaining part of the excitation line beyond the tube being unspecified, the said excitation lines having the same focal length and a sloping towards each other from the tube so that their focii coincide, corresponding ones of their conductor being interconnected at the common focus, and means for firing a brief electrical discharge being provided between the conductors at the common focus whereby, in operation, corresponding points of the laser tube are simultaneously excited by both excitation lines.

An embodiment of the invention is described hereinbelow by way of example, with reference to the accompanying drawings.

DESCRIPTION OF THE PREFERRED EMBODIMENT

Figure 1:
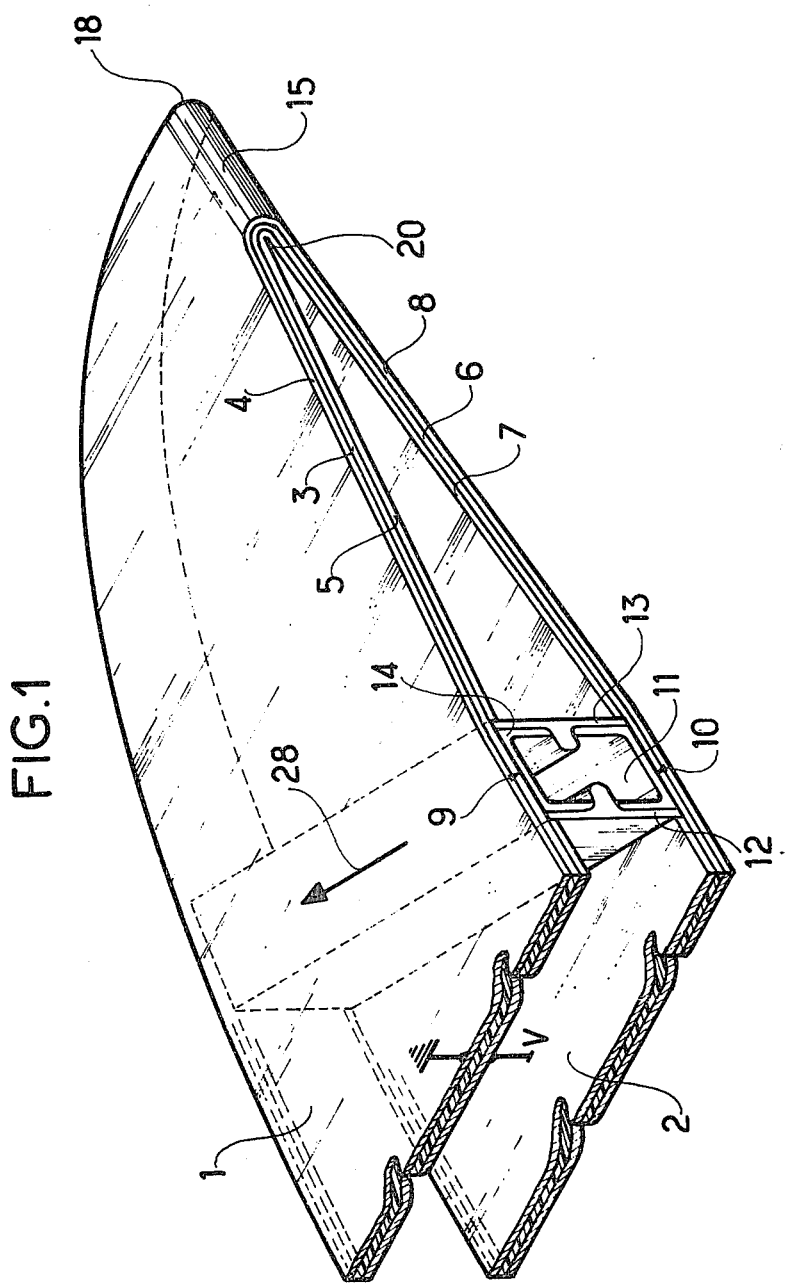
FIG. 1 is a partially cut-away perspective view of an embodiment of the laser generator according to the invention.

FIG. 1 shows a gas laser comprising two flat-plate half parabolas excitation lines 1 and 2. The line 1 comprises an insulating plate 3 interposed between two metallic plates 4 and 5 and the line 2 comprises an insulating plate 6 interposed between two metallic plates 7 and 8. The metallic plates 5 and 7 face one another and each includes a slot, respectively 9 and 10, separating it in to distinct parts. The slots also face one another and the plates 5 and 7 are separated over at least a part of their surface to provide a gap 11 between these slots. Two electrodes 12 and 13 are arranged on either side of these slots, each of these electrodes being connected to the plates 5 and 7 along one edge of these slots. A tube 14 extending along the slots 9 and 10 is disposed in the gap 11 so as to maintain a gaseous active medium between the electrodes 12 and 13. The medium can be, for example, nitrogen. Of course, the tube 14 is closed at its ends in a known way by two windows (not shown).

The electric lines 1 and 2 are disposed parallel to each other over the greater part of their surface, but they are curved towards each other over a part of their periphery so as to be in electrical continuity along a segment 15.

This laser generator operates by firing a brief electric discharge at one end 20 of the segment 15, this discharge generating simultaneously, in the lines 1 and 2, a travelling current wave. For this purpose, firstly, the plate 4 (and consequently also the plate 8) is brought to a potential which can be, for example, that of the earth and secondly, the plate 5 (and also the plate 7) is brought to a different potential V. The electric discharge at the point 20 between the outside plates 4 and 8 and the inside plates 5 and 7 can then be wired by a known firing circuit, for example by means of a spark gap (not shown).

Figure 2:
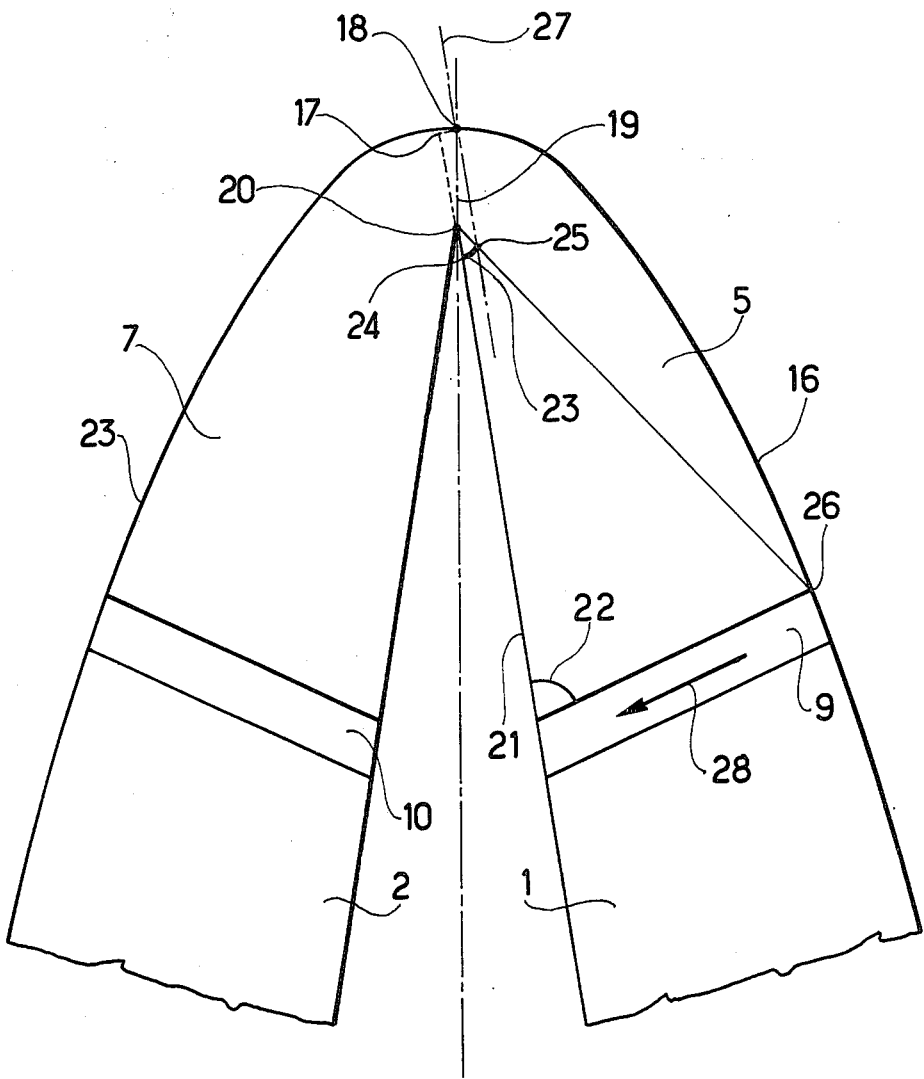
FIG. 2 shows the form of a double flat-plate excitation line by means of which the laser generator described in FIG. 1 can be produced.

The lines 1 and 2 can be produced by bending a double flat-plate excitation line. FIG. 2 illustrates the form which should be imparted to this double excitation line and thus makes it possible to understand better the structure of the laser generator shown in FIG. 1. FIG.

2 shows the metallic plates 5 and 7 of the respective lines 1 and 2 developed in a plane.

The surface of the plate 5 is limited firstly by an arc 16 of a half parabola which does not comprise the apex 17 of this half parabola. The arc 16 extends from a point 18 situated near the apex 17 to a point (not shown) well away from the apex 17, i.e. beyond the broken lines at the bottom of FIG. 2.

The surface of the plate 5 is limited moreover by the segment 19 joining the point 18 and the focus 20 of the half parabola and lastly by a line 21 extending beyond the focus 20 away from the apex 17. The slot 9 of the plate 5 forms an angle 22 which is greater than zero with the line 21.

As can be seen in FIG. 2, the surface of the plate 7 is symmetrical to that of the plate 5 about an axis obtained by projecting the segment 19. The plate 7 is therefore partly limited by an arc 23 of a half parabola which has the same focal length as that of the plate 5. The plates 5 and 7 are in electrical continuity along the segment 19 and are therefore integral with each other and are cut out in practice from a single metal plate.

Of course, the same applies to the metallic plates 4 and 8, whose outside shape is identical to that of the plates 5 and 7.

The insulating plates 3 and 6 project beyond the edges of the metallic plates.

After having disposed these insulating plates 3 and 6 between respectively firstly the metallic plates 5 and 7 and secondly the metallic plates 4 and 8 cut out as shown above, these plates can be bent through an angle of 180° about the axis of symmetry 19, to obtain the electric lines 1 and 2 shown in FIG. 1. It is also seen that the segment 15 along which the electric lines 1 and 2 are in electrical continuity corresponds substantially to the segments such as 19 and as the point 20 at which the electric discharge is fired corresponds to the merged focusses of the half parabolas. The bending is effected so that the half parabola lines 1 and 2 are parallel to each other over the greater part of their surface.

After bending, the gap 11 (FIG. 1) between the slots 9 and 10 must be sufficient to accomodate the tube 14 containing the active gaseous mixture. The size of the gap 11 is evidently greater the greater the angle between the line 21 and the axis of symmetry 19 (FIG. 2), likewise (and this is equivalent) the greater the distance between the points 17 and 18 because of the overlapping of the insulating plates.

A reflector such as 23, in the form of an arc of a circle centred at the focus to the half parabola and disposed on the opposite side to its apex in relation to this focus can advantageously be disposed on each of the plates 5 and 7. The reflector 23 can be constituted for example by a perforation in the plate 5. The dimensions of the reflector 23 are limited by a point 24 situated on the line 21 and by a point 25 situated on the straight line joining the focus 20 to a point 26 at the intersection of the slot 9 to a point 26 on the arc 16 of the half parabola. The point 26 is chosen so that the reflector shades the laser tube from direct radiation from the spark gap. The distance between the points 17 and 18 can be such that the point 25 is situated on the straight line 27 parallel to the axis 21 leading from the point 18.

Such a laser generator operates as follows:

At a given instant, the firing circuit (not shown) emits an electric discharge at the point 20 between the plate 5 and 7 and the plate 4 and 8. The electric discharge generates simultaneously in each of the electric lines 1 and 2 a travelling current wave. The two current waves are in phase, since the lines are identical.

On referring to FIG. 2, it will be seen that the part of the discharge wave which is comprised between the line 21 and the straight line 20-26 is reflected by the reflector 23 and sent back towards the focus 20. The reflector 23 therefore makes it possible to prevent the circular wave emitted at the focus 20 from directly reaching the slot 9 where the active gas is located. Only the reflected part of the wave which is transformed into a rectilinear wave can reach the slot 9.

However, on account of the presence of the reflector 23, this rectilinear wave is prevented from coming from a small part of the reflecting surface of the half parabola, this small part being limited firstly by the apex 17 and secondly by the intersection of the half parabola line 16 with the line 27 parallel to the line 21 leading from the point 25.

Also, on account of the form of the excitation lines described above, the triangle 17-18-20 does not form a part of the useful surface of the plate 5, this amounting also to neutralizing a part near the apex of the reflecting surface of the half parabola. When the limit point 25 of the arc 23 of a circle is situated on the straight line 27, the two neutralized parts are the same, this constituting an advantage.

In each excitation line, the travelling current wave propagates parallel to the axis 21 of the half parabola and therefore reaches successively the atoms and molecules of the active gas in the direction of the arrow 28 parallel to the slot 9.

The angle 22 formed by the slot 9 and the axis 21 is chosen preferably so that its cosine is equal to the ratio between the propagation speed of the discharge wave in the direction of the axis 21 and the propagation speed of a light emission in the direction 28. The stimulated light emission is then effected from one end to the other of the tube 14 in the direction of the arrow 28 at the same speed as the travelling wave. This condition makes it possible to obtain a very powerful coherent laser radiation at the output of the tube 14.

The laser generator described above and illustrated by FIGS. 1 and 2 therefore comprises two flat-plate excitation lines in parallel. Each of these lines is in the form of a part of a half parabola, this making it possible to obtain excellent energy output. This laser generator also retains the advantages inherent to generators according to prior art: low impedance and hence great energy stored and possibility of connecting to earth the outside metallic plates of the excitation lines.

The device according to the invention can be applied more particularly to the producing of nitrogen laser generators.

What is claimed is:

1. A gas laser generator comprising:
   superimposed plates in the following order:
   a first metallic plate, a first insulating plate and a second metallic plate, these plates forming a first excitation line;
   a third metallic plate, a second insulating plate and a fourth metallic plate, these plates forming a second excitation line;
   said second metallic plate and said third metallic plate each including respectively a first slot and a second slot separating them into two distinct parts, these first and second slots being arranged adjacent to each other, the second and third metallic plates being separated over at least a part of their surface to provide a gap between the slots;

two electrodes disposed respectively, on either side of the slots, each of said electrodes being connected to the second and third metallic plates along an edge of these slots; and means disposed in said gap to maintain a gaseous active medium between the electrodes; characterized in that:

the surface of each of the first and second electric lines is limited:

by an arc of a half parabola, said arc not including the apex of said half parabola and being limited by a first point situated near the apex thereof and a second point which is remote from the apex;

by a segment joining together the focus of the half parabola and the first point;

and by a portion of the axis of said half parabola situated in relation to said apex beyond said focus, and wherein each half parabola has the same focal distance, the first and second slots form an angle greater than zero with the axes of said half parabolas, said first and second electric lines being in electrical continuity along said segments, the focusses of the half parabolas being merged at a third point, the first metallic plate being connected to the fourth metallic plate, the first insulating plate being connected to the second insulating plate, the second metallic plate being connected to the third metallic plate; such that when a brief discharge is fired at the third point a progressive current wave is generated simultaneously in the two excitation lines.

2. The laser generator according to claim 1, wherein the means for maintaining the active gaseous medium between the electrodes comprising a tube arranged along the slots, the distance from the first point to the apex of the half parabola being such that said tube is accomodated transversally in said gap between the axis of the half parabolas and the arcs of the half parabolas.

3. The laser generator according to claim 1, wherein each of the second metallic plates and third metallic plates comprises, moreover, a wave reflector extending along an arc of a circle centered at the third point, with the first point and the arc of a circle being situated on opposite sides of the third point.

4. The laser generator according to claim 2, wherein said arc of a circle is further limited firstly by a fourth point constituted by the intersection of said arc of a circle with the axis of the half parabolas and secondly by a fifth point constituted by the intersection of said arc of a circle with a segment joining the third point and the meeting point of the slot with the arc of the half parabolas.

5. The laser generator according to claim 4, wherein the position of the first point in relation to the apex of the half parabolas is chosen so that the line parallel to the axis of the half parabolas passing through the first point passes also through the fifth point.

6. The laser generator according to claim 1, wherein said first metallic plate is grounded such that the first electric potential is the earth potential.

7. The laser generator according to claim 1, whereas the angle is such that its cosine is equal to the ratio of the propagation speed of the travelling current wave along the axis of the half parabolas at the propagation speed of the laser radiation emission of the active gaseous medium in the direction of the slots.

* * * * *